(12) United States Patent
Thebault et al.

(10) Patent No.: US 10,239,499 B2
(45) Date of Patent: Mar. 26, 2019

(54) DEVICE FOR CONNECTING A WIPER ARM AND A WIPER BLADE TOGETHER INCLUDING AN AREA ARRANGED TO RECEIVE A PLURALITY OF SPRAY OPENINGS

(71) Applicant: Valeo Systèmes d'Essuyage, La Verriere (FR)

(72) Inventors: Denis Thebault, Clermont Ferrand (FR); Xavier Bousset, Mezel (FR)

(73) Assignee: Valeo Systèmes d'Essuyage, La Verriere (FR)

( * ) Notice: Subject to any disclaimer, the term of this patent is extended or adjusted under 35 U.S.C. 154(b) by 307 days.

(21) Appl. No.: 14/418,142

(22) PCT Filed: Jul. 30, 2013

(86) PCT No.: PCT/FR2013/051843
§ 371 (c)(1),
(2) Date: Jan. 29, 2015

(87) PCT Pub. No.: WO2014/020282
PCT Pub. Date: Feb. 6, 2014

(65) Prior Publication Data
US 2015/0217731 A1 Aug. 6, 2015

(30) Foreign Application Priority Data
Aug. 2, 2012 (FR) ...................... 12 57522

(51) Int. Cl.
*B60S 1/52* (2006.01)
*B60S 1/38* (2006.01)
*B60S 1/40* (2006.01)

(52) U.S. Cl.
CPC ............. *B60S 1/524* (2013.01); *B60S 1/3862* (2013.01); *B60S 1/40* (2013.01)

(58) Field of Classification Search
CPC ............................... B60S 1/524; B60S 1/3862
(Continued)

(56) References Cited

U.S. PATENT DOCUMENTS

2004/0168296 A1* 9/2004 Wilson ...................... B60S 1/38
29/515
2007/0089257 A1 4/2007 Harita et al.
(Continued)

FOREIGN PATENT DOCUMENTS

CN 102089192 A 6/2011
CN 102414061 A 4/2012
(Continued)

OTHER PUBLICATIONS

DE102010064164A1 (machine translation), 2012.*
(Continued)

*Primary Examiner* — Andrew A Horton
(74) *Attorney, Agent, or Firm* — Osha Liang LLP

(57) ABSTRACT

The invention relates to a connection device (7) suitable for connecting a wiper blade to a wiper arm, including at least one means (8) for rigid connection onto the wiper blade and a means (26) for linking to the wiper arm, said connection device (7) also including at least one duct (9) in which a washing liquid can circulate, and which extends in the longitudinal direction (OX) in which the wiper blade extends, characterized in that it includes at least one area (20) arranged along the duct (9) for distributing of a plurality of openings (21) for spraying the washing liquid. The invention can be used for motor vehicles.

10 Claims, 1 Drawing Sheet

Figure 1:
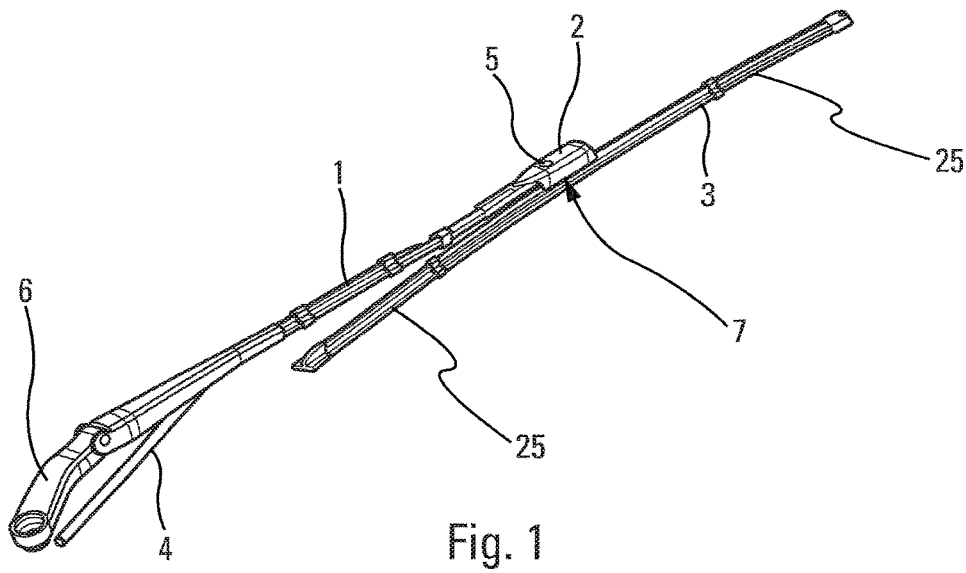

(58) Field of Classification Search
USPC .................................................. 15/250.04
See application file for complete search history.

(56) References Cited

U.S. PATENT DOCUMENTS

| | | | |
|---|---|---|---|
| 2011/0107541 A1* | 5/2011 | Caillot | B60S 1/3862 |
| | | | 15/250.04 |
| 2012/0005855 A1* | 1/2012 | Egner-Walter | B60S 1/3808 |
| | | | 15/250.01 |
| 2012/0066857 A1* | 3/2012 | Webert | B60S 1/3862 |
| | | | 15/250.04 |

FOREIGN PATENT DOCUMENTS

| DE | 102010064164 A1 * | 6/2012 | ................ B60S 1/40 |
|---|---|---|---|
| EP | 1 099 609 A2 | 5/2001 | |
| JP | 2005-145239 A | 6/2005 | |
| JP | 2007112392 A | 5/2007 | |
| JP | 2011-527964 A | 11/2011 | |
| WO | 2010/006776 A1 | 1/2010 | |
| WO | 2011/160952 A1 | 12/2011 | |
| WO | 2012/089407 A1 | 7/2012 | |

OTHER PUBLICATIONS

WO2011160952A1 (machine translation), 2011.*
International Search Report for corresponding International Application No. PCT/FR2013/051843, dated Sep. 23, 2013 (2 pages).
Notification of Reason for Rejection issued in corresponding Japanese Patent Application No. 2015-524837, dated Jun. 2, 2017 (5 pages).
Fourth Office Action in corresponding Chinese application No. 201380045703.X, dated Feb. 23, 2018 (13 pages).

* cited by examiner

DEVICE FOR CONNECTING A WIPER ARM AND A WIPER BLADE TOGETHER INCLUDING AN AREA ARRANGED TO RECEIVE A PLURALITY OF SPRAY OPENINGS

The present invention concerns equipment for vehicles, more particularly equipment for wiping the windows of a vehicle. The present invention concerns a connection device ensuring a mechanical connection between a wiper arm and a wiper blade, and suitable for wiping a windshield or rear window of the vehicle.

Motor vehicles are usually fitted with wiper systems for wiping and washing the windshield and preventing the driver's view of his environment from being obstructed. These wiper systems are conventionally driven by an arm performing a reciprocating angular motion and comprising elongated blades which themselves carry scrapers made of an elastic material. These scrapers rub against the windshield and remove water by transporting it outside the driver's field of vision. The blades are made in the form of either—in the conventional version—articulated yokes which hold the scraper at several separate points, or—in the more recent version known as flat blade—a semi-rigid assembly which holds the scraper over its entire length. In this second solution, the blade is attached to the rotating arm of the wiper system by an assembly consisting of a mechanical connector and an adapter. The mechanical connector is a part which is clamped directly onto the flat blade, while the adapter is an intermediate part which allows the connector to be fixed to the wiper arm. The two parts are linked together by a transverse shaft which allows their relative rotation, in a plane perpendicular to the windshield and passing through the arm.

It is known to attach a bar to the wiper blade for spraying windshield washing fluid. Such a spray bar is formed by a duct which extends along the wiper blade in a main longitudinal extension axis of the blade. This duct has spray openings distributed along this axis following a specific distribution rule presented in document WO2011/160952A1.

The mechanical connector clamped to the wiper blade interrupts the spray bar. This constitutes a major drawback since a strip of the windshield located at the level of the mechanical connector is not sprayed by the washing fluid.

However this mechanical connector has outer forms which hinder the installation of washing fluid spray openings. Such a mechanical connector is therefore not designed to observe the distribution rule for spray openings as explained in the abovementioned document.

Finally, a similar type of mechanical connector may be used for wiper blades of different lengths. The position and distribution of the spray openings therefore differ from one wiper blade length to another. Therefore the zone must allow a variable positioning of the spray openings.

The aim of the present invention is therefore to resolve the drawbacks described above by designing a connection device which comprises a zone dedicated to housing the spray openings, such a zone extending along the connection device so as to spray the vehicle windshield correctly.

The object of the invention is therefore a connection device suitable for connecting a wiper blade to a wiper arm, comprising at least one means for fixing to the wiper blade and a means for linking to the wiper arm, said connection device also comprising at least one duct in which a fluid is able to circulate and which extends in a longitudinal extension direction of the wiper blade, characterized in that it comprises at least one zone arranged along the duct and allowing a distribution of a plurality of fluid spray openings. The function of this zone is to allow the installation of multiple spray openings irrespective of their mutual spacing, i.e. without this installation being hindered by a particular form of the connection device. The zone therefore comprises a plurality of washing fluid spray openings.

The connection device may be fixed to the wiper arm indirectly, for example via an adapter.

The equipped zone is recognizable in that it extends along the connection device and over a portion thereof which faces the window wiped by the wiper blade. This zone has no forms liable to hinder the distribution of the spray openings along the longitudinal axis of the duct.

The connection device may be formed by a base unit in which the duct is arranged, said base unit having on its top a flank in which the linking means is arranged, said zone being provided on an outer face of the base unit. The means for fixing the connection device to the wiper blade may be provided at the base unit.

According to an exemplary embodiment, the zone is arranged on a portion of the outer face opposite the flank relative to the duct. Thus it is guaranteed that the zone at least partly faces the window onto which the washing fluid is sprayed.

The zone has a smooth wall over at least 50% of the outer face of the base unit in a longitudinal extension direction of the duct. In other words, at least 50% of a length of the zone has no forms or roughnesses liable to hinder a drilling of a spray opening.

In one exemplary embodiment, the zone is formed by a groove produced in the base unit along the duct. Such a groove allows the spray openings to be set back relative to the outer face of the base unit. Such a recessed arrangement helps protect these spray openings from external mechanical influences. It also helps improve the general appearance of the wiper blade by hiding the presence of the spray openings.

The groove may be delimited by a smooth base through which the plurality of spray openings is produced.

According to an example of the invention, the connection device comprises a channel for supplying fluid to the duct, such a channel being terminated by a sleeve which opens from the base unit at the zone. The presence of such a sleeve results from the process of molding the connection device, and its cross-section is advantageously smaller than the spacing between two spray openings so as not to hinder their distribution.

It is noted that the sleeve may be sealed by a device for closing the channel, such a closing device being formed for example by a cover mounted tightly on an end part of the sleeve, or by a ball housed tightly in the sleeve. In the case of the cover, the seal is ensured in particular by ultrasonic welding or gluing of the cover to the end part of the sleeve.

According to one example of the invention, a non-constant spacing in the longitudinal direction is provided between the spray openings arranged in the zone. The spacing may increase or decrease from one longitudinal end of the connection device to the other.

The invention also concerns a wiper system for a window of a vehicle, comprising a wiper blade mechanically connected to a wiper arm by at least one connection device as described above.

In such a situation, the wiper arm comprises at least one bar for spraying a window washing fluid and supplied with washing fluid via the connection device. Such a bar may be divided into two parts, each extending longitudinally along the wiper blade from one side or the other of the connection device.

The spray bar comprises a plurality of sprinkler openings, said sprinkler openings and said spray openings being distributed in the longitudinal direction of the wiper blade so as to observe a non-constant spacing between openings along the length of the wiper blade. The distribution principle of the openings along the wiper blade is therefore not interrupted by the connection device.

A first advantage of the invention lies in the possibility of spraying the washing fluid over a strip of the windshield over which the connection device passes during the reciprocating motion of the wiper blade.

A further advantage lies in the possibility of observing a rule for distribution of the spray openings along the wiper blade, including at the level of the mechanical connector.

Another not insignificant advantage lies in the fact that the equipped zone allows these spray openings to be arranged at points which vary according to the length of the wiper blade on which the connection device is mounted. Therefore production can be standardized for the same connection device which may be used for a multiplicity of wiper blade lengths, merely by adapting the position of the plurality of spray openings.

Figure 2:
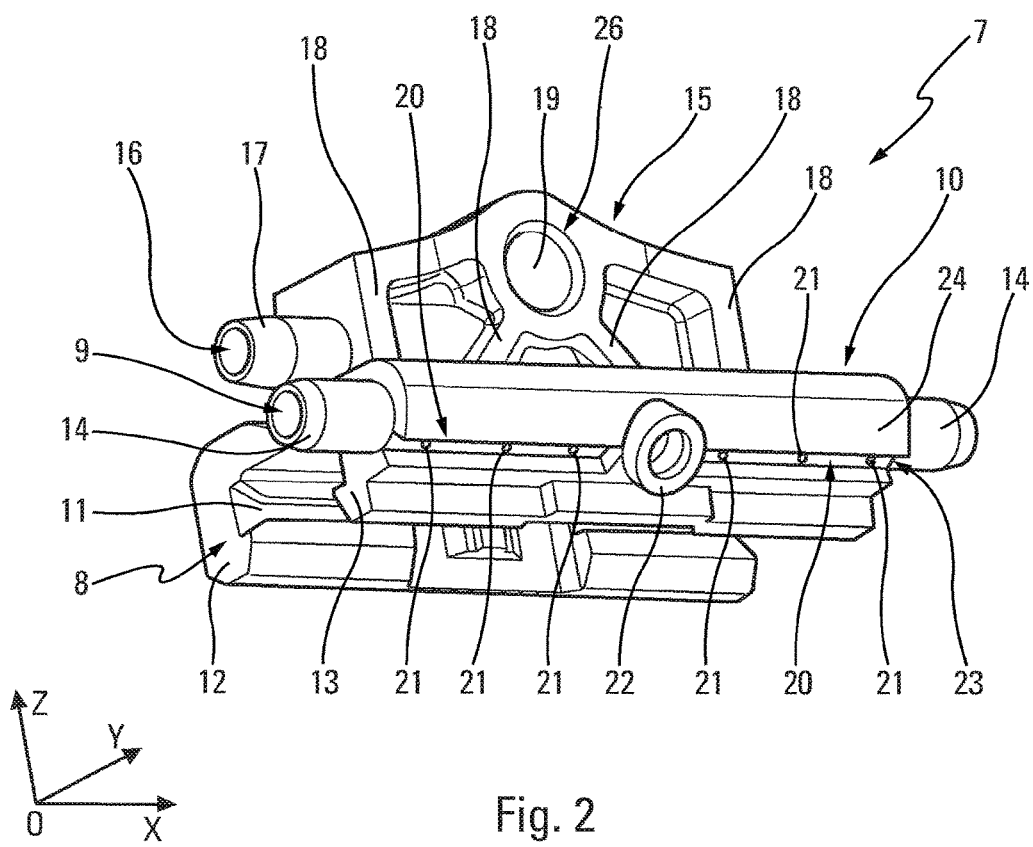

Further characteristics, details and advantages of the invention will arise more clearly from reading the description given below for information, in connection with the drawings in which:

FIG. 1 is a general perspective view of a wiper system for a window of a motor vehicle according to the invention, FIG. 2 is a perspective view of the connection device according to the invention.

It should be noted that the figures depict the invention in detail to allow implementation of the invention, where naturally said figures may in some cases serve to define the invention better.

In the description which follows, the terms "longitudinal" or "lateral" refer to the orientation of the wiper blade according to the invention. The longitudinal direction corresponds to the main axis of the wiper blade in which it extends, while lateral orientations correspond to concurrent straight lines i.e. those which cross the longitudinal direction, in particular perpendicular to the longitudinal axis of the wiper blade in its plane of rotation. For longitudinal directions, the terms "outer" or "inner" apply relative to the fixing point of the blade on the arm, the term "inner" corresponding to the part where the arm and half the blade extend. Finally, the directions described as "upper" or "lower" correspond to the orientations perpendicular to the plane of rotation of the wiper blade, the term "lower" containing the plane of the windshield.

With reference firstly to FIG. 1, we see a wiper system composed of a blade carrier or wiper arm 1 extended at its outer end by a end piece 2, which is fixed on the inside for example by clamping to the arm 1. The end piece 2 cooperates with an adapter carrying a wiper blade 3, via a connection device 7 according to the invention. The purpose of the adapter is for example to be inserted in the end piece 2 by a translation movement in a longitudinal direction, in order to assume a usage position where it is positioned resting against a cooperating form of the end piece 2. It is then fixed reversibly by means for example of a first telescopic locking button 5, which is fixed to the end of a flexible tab starting from the adapter and cooperating with a recess produced to this end in the upper part of the end piece 2.

The adapter and the connection device 7 are mechanically linked together by a linking means. According to an exemplary embodiment, this linking means is a pivot link provided between the adapter and the connection device 7 according to the invention. The wiper blade 3 is thus held in translation relative to the wiper arm 1, while a rotation about the pivot link is permitted by the linking means.

A fluid supply tube 4 runs along the wiper arm 1. This tube 4 conducts a windshield washing fluid in order to bring this to the connection device 7 between the wiper arm 1 and the wiper blade 3.

The wiper blade 3 comprises at least one bar 25 for spraying the window washing fluid. This spray bar 25 is supplied with washing fluid via the connection device 7. Such a spray bar 25 is provided on both sides of the connection device 7. It may for example be formed by a tube provided with spray openings arranged on the wiper blade. It may also be implemented by an air deflector which caps the wiper blade 3 and which accommodates firstly a washing fluid circulation duct extending in the longitudinal direction of the wiper blade 3, and secondly a plurality of washing fluid spray openings.

At the opposite end of the end piece 2, relative to the wiper arm 1, is a drive unit 6 which is provided with a hole, through which passes a shaft of a drive motor or a rod linkage for setting the wiper system in rotation.

With reference now to FIG. 2, we see the connection device 7 according to the invention in more detail. This piece is defined in an orthogonal reference system OX-OY-OZ, where direction OX represents a longitudinal direction, direction OZ represents a vertical direction, and direction OY represents a transverse direction.

The connection device 7 is arranged to be fixed, for example by clamping, to the wiper blade which moves over the windshield of the vehicle. Such a wiper blade is driven in rotation by the wiper arm.

The connection device 7 ensures a so-called full mechanical connection with the wiper blade in the sense that there is no degree of freedom. This full mechanical connection is ensured by a fixing means 8 arranged on the connection device 7.

The connection device 7 comprises a base unit 10 which extends longitudinally and transversely. This base unit 10 receives the means 8 for fixing to the wiper blade, and more particularly to at least one stiffening spine of this wiper blade. This fixing means 8 for example takes the form of at least one undercut 11 made in the base unit 10.

The connection device 7 performs a function of transporting and distributing a windshield washing fluid. For this, the connection device 7 comprises at least one duct 9 in which the washing fluid circulates in order to be distributed in the wiper blade on each side of the connection device 7. This duct 9 is formed by a rectilinear recess, parallel to the longitudinal direction OX, made in the connection device 7 according to the invention. Such a duct 9 is produced on a side of the base unit 10, from which two ferrules 14 extend which delimit the duct 9 and onto which is attached a washing fluid distribution means forming part of the wiper blade, for example the air deflector mentioned above.

In an exemplary embodiment, the base unit 10 comprises two undercuts 11 opposite each other and each made in arms 12 and 13 delimiting the base unit 10. These two undercuts 11 thus form hooks able to engage with the wiper blade.

The base unit 10 has a flank 15 on the top, for example arising from the base unit 10. This flank 15 has a transverse dimension and a longitudinal dimension which are smaller than those of the base unit 10. The flank 15 is for example centered on the base unit 10 in the transverse direction OY and in the longitudinal direction OX.

The flank 15 receives a circulation channel 16 through which the washing fluid may be supplied. Such a channel 16 is thus delimited by the flank 15 and by a ferrule 17, which begins on the flank 15 and onto which is attached the windshield washing fluid transport tube which runs along the wiper arm.

This channel 16 is hydraulically connected to the duct 9. It therefore comprises a first portion which extends substantially in the longitudinal direction OX, followed by a second portion which connects the first portion to the duct 9. This second portion is therefore transverse to the duct 9.

It is noted that the flank 15 may have a plurality of ribs 18 which ensure a mechanical strengthening of the flank 15.

The connection device 7 and the wiper arm are mechanically connected, in particular via the adapter, by means of the linking means 26, for example the pivot link. With regard to the connection device 7, this pivot link is implemented by a cavity 19 made in the flank 15. This cavity 19 extends in the transverse direction OY. In other words, the cavity 19 may be a hole with centre axis parallel to the transverse direction OZ. In the plane OXZ, the cavity 19 has a circular section.

According to the invention, the connection device 7 comprises a zone 20 arranged along the duct 9, allowing distribution of a plurality of washing fluid spray openings 21. Such a zone 20 has no form liable to hinder the distribution of the spray openings 21.

The spray openings 21 are for example holes with transverse axis advantageously perpendicular to the axis of the duct 9. These holes therefore link the duct 9 to the environment surrounding the connection device 7.

According to an exemplary embodiment, this zone 20 is arranged on an outer face 24 of the base unit 10. This zone extends in the longitudinal direction OX, parallel to the duct 9, and over a specific angular sector around the axis of the duct 9. This zone 20 is for example formed on a lower part of the base unit 10, i.e. adjacent to the fixing means 8. In other words, this zone 20 may be arranged in a part of the base unit 10 where the arm 13 begins.

As the flank 15 caps the base unit 10, it is considered that the zone 20 is arranged on a portion of the outer face 24 of the base unit 10 opposite the flank 15 relative to the duct 9.

On the example of FIG. 2, the channel 16 opens from the base unit 10 via a sleeve 22. Such a sleeve 22 extends at the level of the zone 20 and results from the process for production of the connection device 7. This sleeve 22 is sealed by an element attached to an end part of the sleeve. This is for example a cover welded to the sleeve by an ultrasonic welding process. The element may also be formed by a ball forcibly housed in the sleeve so as to seal the latter. The cover or the ball described above constitute exemplary embodiments of a device for closing the channel 16.

When the base unit 10 is fitted with the sleeve 22 described above, the connection device 7 comprises at least two separate zones 20 arranged on either side of the sleeve 22.

According to an exemplary embodiment, it is thus considered that a zone 20 is formed when there is a smooth wall of the outer face 24 of the base unit 10 which extends in a longitudinal direction OX along the duct 9 over at least 50% of this outer face 24, this smooth wall then being provided with the spray openings 21. The smooth nature of the wall is established when the wall has no form liable to hinder the drilling of a spray opening 21.

According to another example illustrated in FIG. 2, the zone 20 is formed by a groove 23 made in the base unit 10 along the duct 9. Such a groove 23 is set back towards the duct 9 relative to the outer face 24 which delimits the base unit 10. In other words, this groove 23 is a rectilinear cavity arranged along the duct 9. The length of the holes forming the spray opening is then reduced to the thickness of the base unit 10 at the level of the groove 23. The latter then has a smooth base in which the drillings are produced which create spray openings 21.

It is noted that the distribution of spray openings 21 provided in the zone 20 may be non-constant. In other words, the spacing separating each pair of spray openings 21 is different. It may for example be developing and linear, in particular increasing or decreasing from one longitudinal end of the connection device 7 to the other.

The connection device 7 described above is advantageously unitary i.e. produced from a same synthetic material. This connection device may thus be produced during a single molding operation, in particular by injection molding.

In the wiper system according to the invention, it is noted that the sprinkler openings of the wiper blade and the spray openings 21 of the connection device 7 are distributed in the longitudinal direction of the wiper blade so as to observe a non-constant spacing between openings. In other words, the spray openings provided in the connection device 7 are made in the continuity of the sprinkler openings produced in the spray bar of the wiper blade. The distribution principle defined in document WO2011/160952A1 is therefore not interrupted by the connection device 7, which significantly improves the cleaning of the vehicle window.

According to one example, the variability of such a spacing may be linear, increasing or decreasing from one longitudinal end to the other of the wiper blade forming part of the wiper system according to the invention.

The connection device depicted in the description of FIGS. 1 and 2 is particularly suitable for mechanically connecting a wiper arm to a wiper blade of the flat blade type, the pivot link allowing implementation of a rotation of the wiper blade relative to the wiper arm. These components therefore form a wiper assembly for a motor vehicle.

The wiper blade of this wiper assembly comprises a scraper, otherwise known as a squeegee, which extends longitudinally along the wiper blade. Said scraper is a flexible component of the wiper blade, pressing against the outer face of the windshield to be wiped.

The wiper blade furthermore comprises at least one element in which at least one duct is arranged which is suitable for conducting the windshield washing fluid. According to an exemplary embodiment, the element is an air deflector which caps an upper part of the wiper blade, such an air deflector being in particular fitted with a deflector vane arranged to utilize the dynamic effect of the movement of the vehicle to increase the contact force of the wiper blade on the windshield.

The wiper blade is provided with two separate elements threaded onto the wiper blade on either side of the connection device according to the invention. In an exemplary embodiment, the two elements have an identical structure to that described above, i.e. delimiting at least one duct and having at least one deflector vane.

The wiper blade also comprises at least one stiffening device for the scraper. Such a stiffening device may be formed by one or two spines, the latter taking the form of a metallic blade which pre-stresses the wiper blade so as to follow a curve when not applied against the windshield. The spine or the two spines are fixed to the scraper forming part of the wiper blade, for example by means of a connector and/or using an end ferrule threaded onto the longitudinal end of the wiper blade. The scraper may be provided with two open slots along the wiper blade and arranged laterally thereon, the two slots each receiving a stiffening spine. Alternatively the blade may comprise a support in which a groove is arranged which receives a lug of the wiper scraper, and a longitudinal housing in which a single stiffening spine is accommodated.

The connector constituting the invention is then advantageously clamped onto the stiffening spine or spines. The end ferrules may also bring the stiffening means towards each other, so as to grip the scraper of the wiper blade.

The invention claimed is:

1. A connection device for connecting a wiper blade to a wiper arm, comprising:
    a base unit;
    at least one duct extending within the base unit from a first terminal longitudinal end of the base unit to a second terminal longitudinal end of the base unit, and having a plurality of spray openings formed therethrough, in which a fluid is able to circulate and which extends in a longitudinal extension direction of the wiper blade;
    a flank disposed on top of the base unit, including a means for linking to the wiper arm;
    at least one means for fixing to the wiper blade; and
    at least one zone formed on an outer face of the base unit,
    wherein the at least one zone comprises at least one groove, the groove comprising a rectilinear cavity formed in the base unit and arranged along the duct, such that the groove exposes the duct and the plurality of spray openings formed therethrough, and
    wherein the groove is delimited by a smooth base through which the plurality of spray openings is produced, and
    wherein the width of the flank is less than the width of the base unit at all portions of the flank.

2. The device as claimed in claim 1, wherein the zone is arranged on a portion of the outer face opposite the flank relative to the duct.

3. The device as claimed in claim 1, wherein the zone has a smooth wall over at least 50% of the outer face in a longitudinal extension direction of the duct.

4. The device as claimed in claim 1, wherein a channel is provided for supplying the fluid to the duct, and wherein the channel is terminated by a sleeve which opens from the base unit at the zone.

5. The device as claimed in claim 4, wherein the sleeve is sealed by a device for closing the channel.

6. The device as claimed in claim 1, wherein a non-constant spacing in the longitudinal direction is provided between the spray openings arranged in the zone.

7. The device as claimed in claim 1, wherein the groove is adjacent to the at least one fixing means.

8. The device as claimed in claim 1, wherein the groove extends longitudinally along a lower portion of the duct.

9. A wiper system for a window of a vehicle, comprising:
    a wiper blade mechanically connected to a wiper arm at least by one connection device, the connection device comprising
    a base unit;
    at least one duct extending within the base unit from a first terminal longitudinal end of the base unit to a second terminal longitudinal end of the base unit, and having a plurality of spray openings formed therethrough, in which a fluid is able to circulate and which extends in a longitudinal extension direction of the wiper blade;
    a flank disposed on top of the base unit, including a means for linking to the wiper arm;
    at least one means for fixing to the wiper blade; and
    at least one zone formed on an outer face of the base unit,
    wherein the at least one zone comprises at least one groove, the groove comprising a rectilinear cavity formed in the base unit and arranged along the duct, such that the groove exposes the duct and the plurality of spray openings formed therethrough, and
    wherein the width of the flank is less than the width of the base unit at all portions of the flank, and
    wherein the wiper blade comprises at least one bar for spraying the fluid, which is supplied with the fluid via the connection device.

10. The system as claimed in claim 9, wherein the spray bar comprises a plurality of sprinkler openings, said sprinkler openings and said spray openings being distributed in the longitudinal direction of the wiper blade so as to observe a non-constant spacing between the sprinkler openings and the spray openings.

* * * * *